March 17, 1953 B. B. BAUER 2,631,857

TWO-SIDED PICKUP AND STYLUS THEREFOR

Filed Oct. 1, 1947 2 SHEETS—SHEET 1

INVENTOR.

Benjamin B. Bauer.

BY

Thiess, Olson & Mecklenburger

Attys.

March 17, 1953 B. B. BAUER 2,631,857

TWO-SIDED PICKUP AND STYLUS THEREFOR

Filed Oct. 1, 1947 2 SHEETS—SHEET 2

INVENTOR.
Benjamin B. Bauer.
BY
Thiess, Olson & Mecklenburger.
Attys.

Patented Mar. 17, 1953 2,631,857

UNITED STATES PATENT OFFICE 2,631,857

TWO-SIDED PICKUP AND STYLUS THEREFOR

Benjamin B. Bauer, Oak Park, Ill., assignor to Shure Brothers, Incorporated, Chicago, Ill., a corporation of Illinois Application October 1, 1947, Serial No. 777,284

6 Claims. (Cl. 274—36)

This invention relates to sound translating units or pickup units for phonographs, more particularly to such units for playing the top of one phonograph record and the bottom of another phonograph record without turning the record over.

Phonographs frequently include record changing apparatus for playing a plurality of records, and the phonograph will play one side of each of the records until the series of records is completed. Thereupon it is necessary to turn the records over so that the other sides thereof may be played. This results in time delays and broken records due, for example, to inadvertent dropping thereof during the necessary handling.

It has been suggested that phonograph apparatus be constructed wherein each record is turned over automatically whereupon all sides may be played with well known pickup and tone arm constructions. Such apparatus is bulky, complicated and difficult to service. Accordingly, it is a further object of the invention to provide improved phonograph tone arm apparatus for playing both sides of a record without turning the record over.

It is a further object of the invention to provide an improved phonograph pickup for playing both sides of a record.

It is a further object of the invention to provide an improved two-sided phonograph pickup.

It is a further object of the invention to provide, in combination, a two-sided pickup and an improved double-ended stylus.

It is a further object of the invention to provide an improved double-ended stylus.

It is a further object of the invention to provide improved means for positioning a double-ended stylus in a phonograph pickup.

It is a further object of the invention to provide a stylus with improved means for orientation thereof.

In carrying out the invention in one form, a translating unit for reproducing the upper and lower sides of a record in a phonograph without turning the record over has been provided comprising a casing to be removably held in the tone arm of a phonograph, a translating element in the casing, a drive member operable to actuate the translating element, said drive member including a stylus receiving opening, said casing including an opening on each side thereof in stylus alignment with said receiving opening, and a double-ended stylus having a holding portion in said receiving opening and having a pair of record engaging portions projecting outwardly through said aligned openings, said stylus including means associated with said holding portion for indicating approximate location of the stylus in the pickup unit, said holding portion including means cooperating with said pickup for exact location of the stylus therein.

For a more complete understanding of the invention reference should be had to the accompanying drawings in which.

Figure 1:
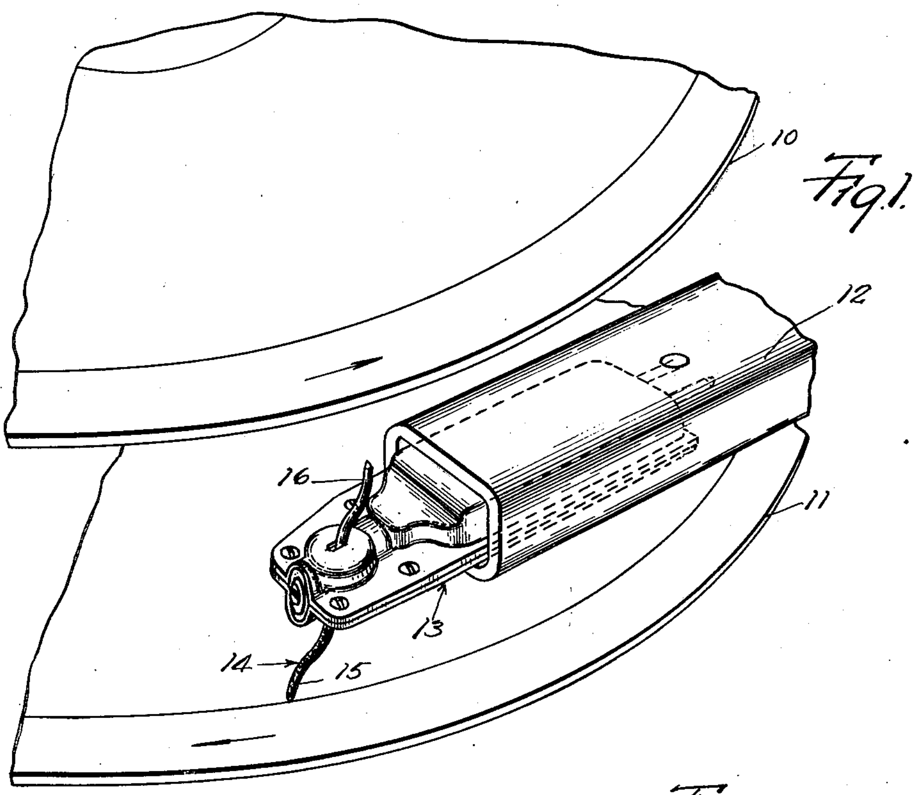
Fig. 1 is a fragmentary view in perspective of apparatus embodying the invention.
Figure 2:
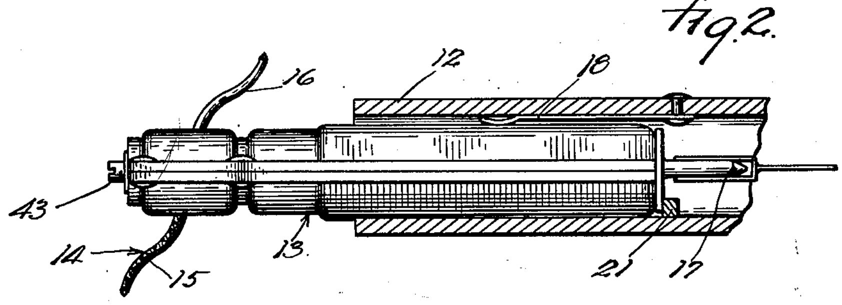
Fig. 2 is a fragmentary elevational view partially in section of apparatus shown in Fig. 1.

Referring to the drawings, the invention is shown as comprising phonograph reproducing apparatus including a pair of records 10 and 11 and a tone arm 12 adapted to hold a pickup unit 13. A stylus 14 is held in the pickup unit, the stylus having a pair of record engaging portions 15 and 16 extending respectively from the two sides of the pickup whereby portion 15 may engage the upper side of record 11 rotating in the clockwise direction, and the point 16 may engage the lower side of record 10 rotating in the counterclockwise direction.

The stylus 14 shown in the drawings is disclosed and claimed in application Serial No. 90,689, filed April 30, 1949, assigned to the same assignee as the present application, and entitled "Two-Sided Stylus," that application being a division of the present application.

Record changing apparatus as such forms no part of the present invention and is not disclosed. It will be understood that any well known apparatus may be used in which records 10 and 11 are rotated at the proper times relative to stylus portions 15 and 16. Tone arm 12 may be one of any well known construction and is illustrated by way of example as comprising a hollow structure into which the pickup cartridge 13 may be received bodily, the pickup cartridge including a pair of contact prongs 17 for conducting electrical impulses therefrom to suitable amplifying and reproducing apparatus. A spring 18 may be attached to the inside of the tone arm for holding the pickup therein and a stop 21 may be provided for determining the inward position of the pickup.

The tone arm holding pickup 13 may be lowered onto record 11 and may be moved upwardly so that stylus portion 16 may engage the lower side of record 10, or the record 10 may be lowered onto the stylus without departing from the scope of the invention.

Figure 3:
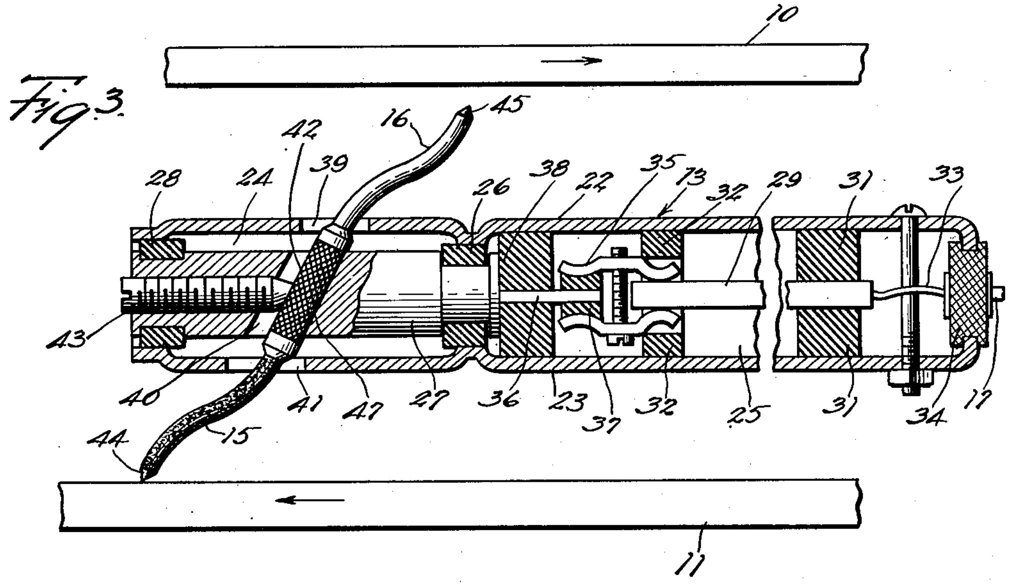
Fig. 3 is a fragmentary sectional view on a larger scale of the apparatus shown in Fig. 1.

Referring to Fig. 3, pickup 13 is a unitary structure comprising upper and lower casing members 22 and 23 which may be formed as shown by any suitable operation, such as by stamping or casting, and from any suitable material such as brass, aluminum or plastic. As shown, members 22 and 23 together form essentially a forward compartment 24 and a rearward compartment 25. The forward compartment 24 is formed by an indented portion in casing members 22 and 23, which indented portion holds a bearing member 26 which may be formed of rubber or other resilient material, for example, the bearing member supporting one end of a drive unit 27. The other end of drive unit 27 is supported in a bearing at the front end of chamber 24, which bearing comprises a rubber or other resilient member 28. Bearing members also 26 and 28 absorb minor vibrations of drive unit 27.

Within chamber 25 a translating element 29, such as a Rochelle salt crystal, is supported by means of damping members 31 at the rear end thereof and damping members 32 at the forward end thereof, deformations of the crystal of course producing an electrical output. The electrical output is conducted through conductors 33 to prongs 17 which are supported by an insulating member 34 held between casing members 22 and 23. At the forward end of the translating element there are a pair of straps forming a yoke 35 which engages a flat connecting member 36 through a pair of resilient members 37, the connecting member 36 forming an integral part of a drive unit 27. On each side of connecting member 36 there are a pair of vibration damping resilient supporting members 38. The resilient members 31, 32 and 38 may be formed of any well known material, such for example as rubber or a viscoloid, one form of which is Du Pont Pyralin, Type X-2450, and preferably are formed of such materials having some resilience as well as the ability to absorb energy. Consequently, these members form damping elements to prevent undesirable resonances of the various structural elements. Resilient members 37 between straps 35 and connecting member 36 form a resilient connection between drive member 27 and crystal 29 to take account of the fact that crystal 29 may be very stiff and hence should be subjected to relatively small deformations. By virtue of coupling members 37, the stylus 14 may follow the undulations in phonograph record grooves without placing undue stress on the crystal.

Substantially centrally of drive member 27 there is a hole 40 extending therethrough having its axis lying at an angle to the axis of the drive member, whereby stylus 14, held within hole 40, is held at the angle desired relative to records 10 and 11. Top member 22 and bottom member 23 respectively include openings 39 and 41 substantially in axial alignment with hole 40 in order that the stylus members 15 and 16 may project therethrough as shown.

Figure 4:
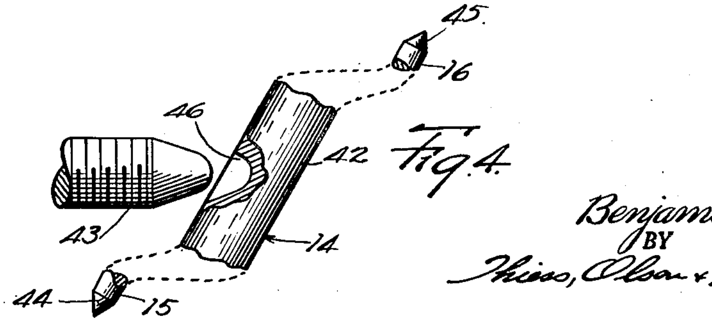
Fig. 4 is a fragmentary view on a larger scale of the apparatus shown in Fig. 3.

Referring to Figs. 3 and 4, stylus 14 includes a central enlarged portion 42 from which the record engaging portions 15 and 16 extend at the respective ends, the portion 42 being of sufficient length so as to extend completely through the hole in driving member 27 and approach closely to the outside of the front portions of casing members 22 and 23. Portion 42 also is of sufficient diameter so as to form a very rigid section for holding the stylus within the hole 40 when engaged by a screw 43 which is axially threaded in the drive member. Stylus portions 15 and 16 are smaller in diameter than central portion 42 and are reverse curved in form whereby a desirable amount of resiliency is imparted thereto. Accordingly, portions 15 and 16 are spaced on each side of the axis of portion 42, and terminate respectively in record engaging points 44 and 45. The record engaging point 44 is spaced forwardly of portion 42 for engaging record 11 rotating in the clockwise direction at the optimum point, and the record engaging point 45 is spaced rearwardly of portion 42 for engaging record 10 rotating counterclockwise, also at the optimum point.

Central portion 42 is provided with a generally conical hole 46 for receiving the correspondingly shaped end of screw 43 for holding the stylus within hole 40. Since the portion 42 is at an angle to the axis of screw 43, and the axis of hole 46 coincides with that of screw 43, the hole 46 has an unsymmetrical disposition in portion 42. In consequence thereof, the stylus is not reversible and must be placed within the hole 38 with the same position at all times. Otherwise the screw 43 will not be received within hole 46 at the proper angle with the consequence that the points 44 and 45 would not project equally on each side of the pickup. In order that the stylus may be properly placed in hole 38 so that the portion 15 projects from the bottom of the pickup and the portion 16 projects from the top thereof, portion 15 may be colored differently than 16. For example portion 15 may be painted black and portion 16 may be painted white. When the stylus has been placed through hole 38 with portion 15 projecting from the bottom of the pickup, the approximate centering of the stylus may be indicated by a coating of paint 47 surrounding central portion 42. The coating of paint may have an extent approximating that of portion 42 so that whenever this band is completely obscured within the pickup the stylus is approximately centered. Whereupon tightening of screw 23 forces the point into hole 46 and centers the stylus exactly, since the stylus will move in order that hole 46 conforms to the point of screw 43.

The axes of points 44 and 45, that is lines bisecting these points, preferably lie parallel to the axis of portion 42, and in order that the stylus may be removed from the pickup and placed therein, the dimensions of holes 40, 39 and 41 are made sufficiently large to accommodate the reverse curves of portions 15 and 16.

Figure 5:
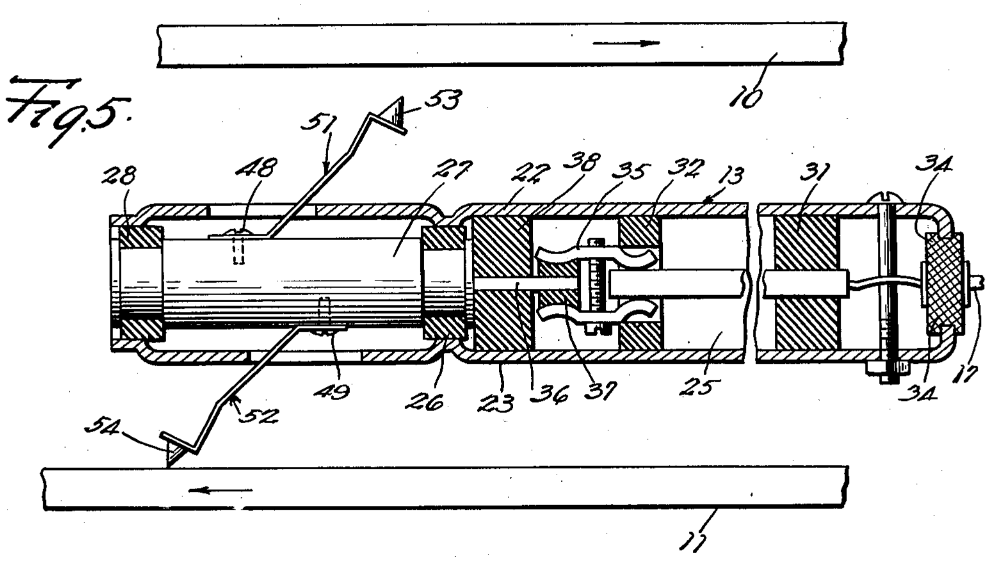
Fig. 5 is a view similar to Fig. 3 of a modified form of the invention.

Referring to Fig. 5 a pickup and records are shown corresponding to those of the previous figures. Instead of having a single stylus with two record engaging points, the drive member 27 is provided with holes for receiving screws 48 and 49 which hold a pair of styluses 51 and 52 to the opposite sides of the drive member. The two parts of the casing 22 and 23 are provided with sufficiently large holes in order that a screwdriver may be inserted externally to remove or fasten the styluses to the drive member and at the same time to permit the styluses to project at the desired angle. The styluses may be formed with an attaching arm having suitable points 53 and 54 respectively at the ends thereof, these points being made, for example, of hardened steel or jewel members such as sapphire. The axis of the record engaging points are parallel to each other and the points occupy substantially the same positions as the points of stylus 14.

While particular embodiments of the invention have been shown, it will be understood, of course, that the invention is not limiteed thereto since many modifications may be made, and it is, therefore, contemplated by the appended claims to cover any such modifications as fall within the true spirit and scope of the invention.

Having thus described the invention, what is claimed and desired to be secured by Letters Patent is:

1. A two-sided phonograph pickup comprising a casing, a translating element therein, drive means operable to actuate said element, said drive means having a transverse hole extending therethrough, a double ended stylus comprising a shank portion and a record engaging portion having a record engaging point at each end thereof, said shank and said record engaging portions being a unitary combination receivable as such with said shank portion in said hole, said shank member including a recess, said recess including upper and lower wall surfaces and side wall surfaces, and a clamping member coacting with said drive means to urge the end of said clamping member into said recess, the end of said clamping member engaging with said upper and lower wall surfaces to position said stylus transversely of said pickup, and engaging the said side wall surfaces to position said stylus rotationally in said pickup.

2. A two-sided phonograph pickup comprising a casing, a translating element therein, drive means operable to actuate said element, said drive means having a transverse hole extending therethrough, a double ended stylus comprising a shank portion and a complaint record engaging portion having a record engaging point at each end thereof, said shank and said record engaging portions being a unitary combination receivable as such with said shank portion in said hole, said shank member including a recess, said recess including upper and lower wall surfaces and side wall surfaces, and a clamping member coacting with said drive means to urge the end of said clamping member into said recess, the end of said clamping member engaging with said upper and lower wall surfaces to position said stylus transversely of said pickup, and engaging the said side wall surfaces to position said stylus rotationally in said pickup.

3. A two-sided phonograph pickup comprising a casing, a translating element therein, drive means operable to actuate said element, said drive means having a transverse hole extending therethrough, a double ended stylus comprising a shank portion and a record engaging portion having a record engaging point at each end thereof, said shank and said record engaging portions being a unitary combination receivable as such with said shank portion in said hole, said shank member including a substantially conical recess, said recess including upper and lower wall surfaces and side wall surfaces, and a clamping screw threaded into said drive means for urging the end of said screw into said conical recess, the end of said clamping member engaging with said upper and lower wall surfaces to position said stylus transversely of said pickup, and engaging the said side wall surfaces to position said stylus rotationally in said pickup.

4. A two-sided phonograph pickup comprising a casing, a translating element therein, drive means operable to actuate said element, said drive means having a transverse hole extending therethrough, a double ended stylus comprising a shank portion, a record engaging portion at each end thereof and a record engaging tip at the end of each of said record engaging portions and laterally displaced from said shank portion, said shank and said record engaging portions being a unitary combination receivable as such with said shank portion in said hole, said shank member including a recess, said recess including upper and lower wall surfaces and side wall surfaces, the axis of said recess lying in the plane determined by said shank portion and said record engaging portions, the end of said clamping member engaging with said upper and lower wall surfaces to position said stylus transversely of said pickup, and engaging the said side wall surfaces to position said stylus rotationally in said pickup.

5. A two-sided phonograph pickup comprising a casing, a translating element therein, drive means operable to actuate said element, said drive means having a transverse hole extending therethrough, a double ended stylus comprising a shank portion and a record engaging portion having a record engaging point at each end thereof, said shank and said record engaging portions being a unitary combination receivable as such with said shank portion in said hole, said shank member including a recess, said recess including upper and lower wall surfaces and side wall surfaces, and a clamping member coacting with said drive means to urge the end of said clamping member into said recess, the end of said clamping member engaging with said upper and lower wall surfaces to position said stylus transversely of said pickup, and engaging the said side wall surfaces to position said stylus rotationally in said pickup, one of said record engaging portions including indicia for indicating the orientation of said stylus in said pickup.

6. A two-sided phonograph pickup comprising a casing, a translating element therein, drive means operable to actuate said element, said drive means having a transverse hole extending therethrough, a double ended stylus comprising a shank portion and a record engaging portion having a record engaging point at each end thereof, said shank and said record engaging portions being a unitary combination receivable as such with said shank portion in said hole, said shank member including a recess, said recess including upper and lower wall surfaces and side wall surfaces, and a clamping member coacting with said drive means to urge the end of said clamping member into said recess, the end of said clamping member engaging with said upper and lower wall surfaces to position said stylus transversely of said pickup, and engaging the said side wall surfaces to position said stylus rotationally in said pickup, one of said record engaging portions including indicia for indicating the orientation of said stylus in said pickup, said shank means being adapted to indicate approximate location of said stylus and said pickup.

BENJAMIN B. BAUER.

REFERENCES CITED

The following references are of record in the file of this patent:

UNITED STATES PATENTS

| Number | Name | Date |
|---|---|---|
| 1,103,829 | Possons | July 14, 1914 |
| 1,270,526 | Keen et al. | June 25, 1918 |

| Number | Name | Date |
|---|---|---|
| 1,362,173 | Moser | Dec. 14, 1920 |
| 1,775,510 | Caputo | Sept. 9, 1930 |
| 1,848,973 | Penteado | Mar. 8, 1932 |
| 1,992,893 | Thomas | Feb. 26, 1935 |
| 2,265,840 | Hutter | Dec. 9, 1941 |
| 2,320,427 | Guedon | June 1, 1943 |
| 2,328,889 | Capps | Sept. 7, 1943 |
| 2,336,241 | Graveley | Dec. 7, 1943 |
| 2,455,913 | Bauer | Dec. 14, 1948 |
| 2,479,894 | Andrews | Aug. 23, 1949 |